United States Patent [19]
Nakajima et al.

[11] 3,842,600
[45] Oct. 22, 1974

[54] EXHAUST CLEANING APPARATUS FOR INTERNAL COMBUSTION ENGINES

[75] Inventors: Yasuo Nakajima; Shin-Ichi Nagumo; Toru Yoshimura; Saburo Usui, all of Yokosuka, Japan

[73] Assignee: Nissan Motor Company Limited, Yokohama City, Japan

[22] Filed: Mar. 21, 1973

[21] Appl. No.: 343,261

[30] Foreign Application Priority Data
Mar. 22, 1972 Japan.............................. 47-28843
Mar. 22, 1972 Japan.............................. 47-28844

[52] U.S. Cl................ 60/276, 60/286, 60/294, 60/301
[51] Int. Cl............................................ F02b 75/10
[58] Field of Search........... 60/276, 286, 301, 303, 60/289, 290, 299, 285, 294

[56] References Cited
UNITED STATES PATENTS

| | | |
|---|---|---|
| 3,389,972 | 6/1968 | Pottharst.......................... 60/299 |
| 3,544,264 | 12/1970 | Hardison.......................... 60/301 |
| 3,696,618 | 10/1972 | Boyd................................ 60/276 |
| 3,704,591 | 12/1972 | Tatsutomi........................ 60/290 |
| 3,730,157 | 5/1973 | Gerhold........................... 60/285 |
| 3,738,341 | 6/1973 | Loos................................. 60/285 |
| 3,757,521 | 9/1973 | Tourtellotte..................... 60/274 |
| 3,768,259 | 10/1973 | Carnahan......................... 60/285 |

*Primary Examiner*—Douglas Hart

[57] ABSTRACT

An exhaust cleaning apparatus for an internal combustion engine, the apparatus being of the character which uses a converter unit consisting of a reducing catalyst to reduce the nitrogen oxide in the exhaust gases and an oxidizing catalyst to oxidize the carbon monoxide and unburned hydrocarbons in the exhaust gases passed from the reducing catalyst, wherein additional hydrocarbons are injected into the exhaust gases entering the reducing catalyst when the engine is operating on an air-fuel mixture having a relatively large air-to-fuel ratio and/or when the exhaust gases contain a practically negligible amount of nitrogen oxide.

9 Claims, 8 Drawing Figures

EXHAUST CLEANING APPARATUS FOR INTERNAL COMBUSTION ENGINES

The present invention relates to internal combustion engines of, for example, motor vehicles and more particularly to exhaust cleaning apparatus for use in the internal combustion engines.

For the purpose of eliminating or reducing toxic chemical compounds such as carbon monoxides, unburned hydrocarbons and nitrogen oxides in the exhaust gases from the internal combustion engines of motor vehicles and industrial equipment, various types of exhaust cleaning devices have thus far been proposed and gained widespread commercial acceptance. The present invention is directed specifically to an exhaust cleaning device of the character which uses a catalytic converter disposed in the exhaust system of the engine for chemically converting the noxious compounds into harmless gases while the exhaust gases are being passed through the exhaust system. The catalytic converter consists of a reducing catalyst which is active to convert the nitrogen oxides into nitrogen and oxygen and an oxidizing catalyst which is located downstream of the reducing catalyst for oxidizing or re-combusting the carbon monoxide and unburned hydrocarbons into carbon dioxide and water. Means are provided by which additional fuel such as hydrocarbons in the forms of, for example, gasoline or liquefied petroleum gas is admixed to the exhaust gases that are about to enter the reducing catalyst for the purpose of increasing the conversion efficiency of the reducing catalyst.

Experiments have revealed that the conversion efficiency of the reducing catalyst peaks up when the air-fuel mixture supplied to the engine is proportioned to a theoretical air-to-fuel ratio. The conversion efficiency gradually droops as the air-to-fuel ratio of the mixture becomes smaller (so that the mixture becomes richer) and abruptly drops as the air-to-fuel ratio becomes larger (so that the mixture becomes leaner). To maintain the conversion efficiency of the reducing catalyst at satisfactory levels throughout various modes of operation of the engine, it is accordingly preferred that the exhaust gases entering the reducing catalyst be mixed with the additional hydrocarbons when the air-fuel mixture is enriched beyond the theoretical air-to-fuel ratio. The exhaust cleaning device using the catalytic converter is thus useful where the internal combustion engine incorporating the cleaning device is arranged in a manner to be operable on an air-fuel mixture which is proportioned to a mixture ratio appropriately smaller than the theoretical value which is established.

Generally, the internal combustion engines of, for example, motor vehicles are so designed that the air-fuel mixture be enriched under heavy-load and light-liad driving conditions or, in other words, during full-throttle and closed-throttle operations in view of the various operational requirements of the engines. For the saving of the fuel and in view of the fact that the oxidizing catalyst tends to be subjected to increased loads in consequence of the enrichment of the mixture, it is objectionable to arrange in a manner to operate on the enriched mixture throughout the heavy-load and light-load driving operations. In the internal combustion engine incorporating the catalytic converter of the described character, it is desired that the air-fuel mixture be proportioned in the neighbourhood of the theoretical air-to-fuel ratio under the heavy-load and light-load conditions of the engine and that the additional hydrocarbons be mixed with the exhaust gases entering the reducing catalyst under such conditions that the air-fuel mixture is leaned out as during the medium-load driving conditions of the engine.

It is, accordingly, an important object of the present invention to provide an improved exhaust cleaning device for the internal combustion engine which is operable on a relatively lean mixture and which is thus adapted to provide economy in fuel consumption.

It is another important object of the invention to provide an improved exhaust cleaning device using a catalytic converter having reducing and oxidizing catalysts disposed in an exhaust system of the engine for the purpose of eliminating toxic chemical compounds in the exhaust gases emitted from the engine throughout the various modes of operation of the engine.

It is still another important object of the present invention to provide an improved exhaust cleaning device incorporating a reducing catalyst to reduce the nitrogen oxides in the exhaust gases from the engine and means adapted to supply additional hydrocarbons entering the reducing catalyst under the medium-load driving conditions of the engine.

The air-fuel mixture supplied to the engine is enriched beyond the theoretical air-to-fuel ratio not only under the heavy-load and light-load driving conditions but during other driving conditions which include starting, cold driving, idling, acceleration and deceleration as is well known in the art. When the engine is being driven under these conditions, it is desired that the supply of the additional hydrocarbons to the exhaust gases be interrupted in view of the fuel economy and of the increased load exercised on the oxidizing catalyst of the catalytic converter as a result of the enrichment of the air-fuel mixture supplied to the engine. For the reasons previously described and for the protection of the reducing and oxidizing catalysts, moreover, the supply of the additional hydrocarbons to the exhaust system may also be interrupted when the engine is being driven without emitting a material amount of toxic nitrogen oxide. This particular condition may be represented by a condition in which the reducing and oxidizing catalysts are being warmed up to their operating temperatures and a condition in which the catalysts are excessively heated beyond the operating temperatures so that critical deterioration of the performance quality of the catalysts tends to be created and/or a danger of the catalysts being burned is invited. For these reasons, the exhaust cleaning apparatus according to the present invention may preferably so arranged that the delivery of the additional hydrocarbons to the exhaust gases entering the reducing catalyst is interrupted under the heavy-load or loght-load driving, starting from cold, idling, acceleration or deceleration condition or when the temperature of the catalysts are higher or lower than predetermined temperature ranges which are effective to maintain the catalysts active on the toxic compounds in the exhaust gases.

It is, thus, further and another important object of the present invention to provide an improved exhaust cleaning device having a reducing catalyst adapted to reduce the nitrogen oxide in the exhaust gases from the engine and means to supply the additional hydrocarbons to the exhaust gases entering the reducing catalyst under predetermined driving conditions in which the engine is driven with a relatively lean air-fuel mixture or the exhaust gases from the engine are practically clear of the toxic nitrogen oxide.

The exhaust cleaning apparatus adapted to accomplish these objects of the present invention will comprise in essence reducing catalyst means disposed in an exhaust system of the internal combustion engine for reducing nitrogen oxides in exhaust gases from the engine, oxidizing catalyst means disposed in the exhaust system downstream of the reducing catalyst means for oxidizing carbon monoxide and unburned hydrocarbons in the exhaust gases, additional fuel supplying means for admixing additional hydrocarbons to the exhaust gases entering the reducing catalyst means, and control means for controlling the additional fuel supplying means to interrupt the supply of the additional hydrocarbons to the exhaust gases in response to engine operating conditions producing enrichment of an air-fuel mixture to be supplied to the engine.

When the air-fuel mixture for the engine is enriched during the various driving conditions of the engine previously discussed, reduction in the concentration of oxygen in the exhaust gases from the engine results as a natural result of the enrichment of the mixture. Thus, the control means forming part of the exhaust cleaning apparatus having the general construction above described may be arranged to be responsive to the variation in the concentration of the oxygen in the exhaust gases so that the supply of the additional hydrocarbons is interrupted when the concentration of the oxygen is lower than a predetermined level. In this instance, the control means of the exhaust cleaning apparatus may comprise a sensor responsive to the concentration of oxygen in the exhaust gases entering the reducing catalyst for producing an electric signal in response to a concentration of the oxygen lower than a predetermined level, and a switching arrangement which is electrically connected between the sensor and the aforesaid additional fuel supplying means, wherein the switching arangement includes switch means operative to be actuated by the signal from the sensor for causing the additional fuel supplying means to be inoperable to deliver the additional hydrocarbons into the exhaust system upstream of the reducing catalyst. Where desired, the switching arangement may further include second and third switch means which are connected in series between the first switch means and the additional fuel supplying means, the second switch means being responsive to the load on the engine and operative to open in response to an engine load smaller than a first predetermined value or greater than a second predetermined value larger than the first predetermined value and the third switch means responsive to a starting condition of the engine and operative to open when the engine is at start. Where still desired, the switching arrangement may further include fourth switch means serially connected between the first, second and third switch means and responsive to the temperatures of the reducing and oxidizing catalysts, the fourth switch means being operative to close in response to predetermined temperature ranges of the catalysts within which the catalysts are maintained active.

As an alternative to the switching arrangement responsive to the concentration of the oxygen in the exhaust gases, the control means of the exhaust cleaning apparatus may comprise a combination of first and second switch means serially connected to the additional fuel supplying means, the first switch means being responsive to the load on the engine and operative to open in response to an engine load smaller than a first predetermined value or greater than a second predetermined value larger than the first predetermined value and the second switch means being responsive to an acceleration condition of the engine and operative to open in response to the acceleration condition. Where desired, the control means may further comprise third switch means serially connected to the first and second switch means and responsive to the starting condition of the engine for opening when the engine is being started from the rest condition. If still desired, the control means may further comprise fourth and fifth switch means serially connected to the above mentioned first, second and third switch means and responsive to the temperatures of the reducing and oxidizing catalyst means, respectively. These fourth and fifth switch means are operative to close in response to predetermined temperature ranges of the reducing and oxidizing catalyst means, respectively, so that the additional fuel supplying means is controlled to deliver the additional hydrocarbons into the exhaust system when the reducing and oxidizing catalysts are maintained active on the exhaust gases while the engine is being driven under the heavy-load or light-load driving conditions or under the decelerating or accelerating condition. The control means may further comprise sixth switch means serially connected to the first to fifth switch means and response to the temperature of the engine or, more specifically the temperature of the cooling fluid for the engine, the sixth switch means being operable to open before the engine is warped up to its operating temperature.

Other features and advantages of the exhaust cleaning apparatus according to the present invention will become more apparent from the following description taken in conjunction with the accompanying drawings in which like reference numerals indicate corresponding parts and in which.

Figure 1:
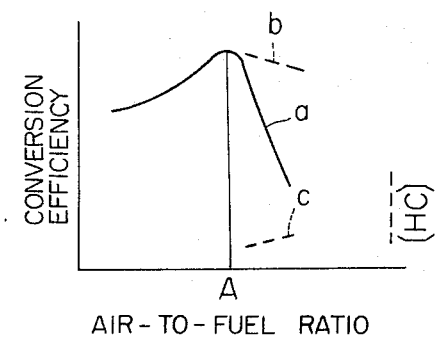
FIG. 1 is a graph illustrating curves which are indicative of variation in the conversion efficiency of a nitrogen oxide reducing catalyst in terms of the air-to-fuel ratio as attained in the exhaust cleaning device of the character to which the present invention is directed.

Referring to FIG. 1, curve $a$ is indicative, in terms of the air-to-fuel ratio of the mixture supplied to the engine, of variation in the conversion efficiency with which the nitrogen oxide contained in the exhaust gases from the engine is reduced to nitrogen and water by means of the known converter unit which consists of the reducing and oxidizing catalysts disposed in series in the exhaust system of the engine. As will be seen from curve $a$, the conversion efficiency peaks up when the engine is supplied with an air-fuel mixture proportioned to the theoretical air-to-fuel ratio A, gradually drooping as the mixture becomes richer with the air-to-fuel ratio reduced from the value R and steeply dropping as the mixture is leaned out with the air-to-fuel ratio increased beyond the value A. If, in this instance, the exhaust gases entering the reducing catalyst are added with additional hydrocarbons at a rate indicated by curve $c$ when the mixture has an air-to-fuel ratio which is higher than the theoretical value R as previously discussed, the conversion efficiency rises to a level indicated by curve $b$. This means that the nitrogen oxide in the exhaust gases can be reduced to satisfactorily low levels throughout the various driving conditions if the engine is so arranged as to operate on a mixture having air-to-fuel ratios substantially equal to or appreciably lower than the theoretical value A during the conditions in which the engine is usually supplied with an enriched air-fuel mixture and if the additional hydrocarbons are admixed to the exhaust gases when the engine operates on a leaned mixture.

Figure 2:
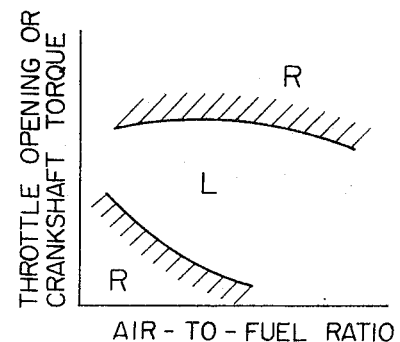
FIG. 2 is a graph illustrating the operational regions in which a usual internal combustion engine is driven with rich and lean air-fuel mixtures, the regions being indicated in terms of the revolution speed of the engine and the torque of the engine crankshaft or the effective working area at the throttle valve of the mixture supply system of the engine.

Whereas, the internal combustion engines are generally arranged so that the mixture is enriched during the light-load and heavy-load driving conditions. These conditions are indicated by regions R in the graph of FIG. 2 wherein those conditions in which the engine is to operate on a leaned mixture are indicated by a region L. In FIG. 2, the driving load of the engine is represented by the degree of opening (i.e., the effective working area) of the throttle valve of the mixture supply system of the engine or the torque of the crankshaft of the engine in terms of the air-to-fuel ratio of the mixture supplied to the engine. The particular conditions providing the regions R and L may otherwise be represented by the vacuum in the intake manifold of the engine in terms of the engine revolution speed, as seen in FIG. 3.

Thus, the nitrogen oxide in the exhaust gases is converted into the harmless compounds without admixing the additional hydrocarbons to the exhaust gases when the engine is operating under the conditions corresponding to the regions R and through introduction of the additional hydrocarbons into the exhaust system when the engine is operating under the conditions represented by the region L.

Figure 3:
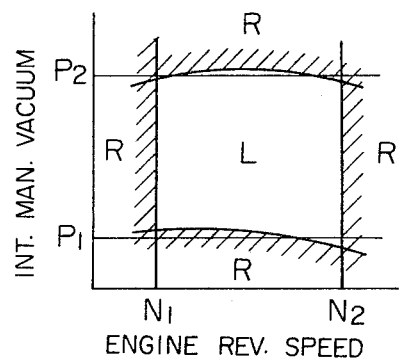
FIG. 3 is also a graph indicating the regions in which the engine operates on rich and lean mixtures, the regions now being indicated in terms of the vacuum in the intake manifold and the revolution speed of the engine.

As previously noted, the air-fuel mixture for the engine is enriched not only under the light-load and heavy-load driving conditions but during starting, acceleration, deceleration and cold driving conditions which are not necessarily covered by the regions R and the concentration of the nitrogen oxide in the exhaust gases is lessened during those conditions in which the temperature of the exhaust gases and accordingly the temperatures of the reducing and oxidizing catalysts are maintained within certain ranges which also can not be represented by the regions R in FIGS. 2 and 3. The present invention thus contemplates provision of an improved exhaust cleaning apparatus which is capable of responding to all these conditions in which the additional hydrocarbons should or need not be supplied to the exhaust gases.

Figure 4:
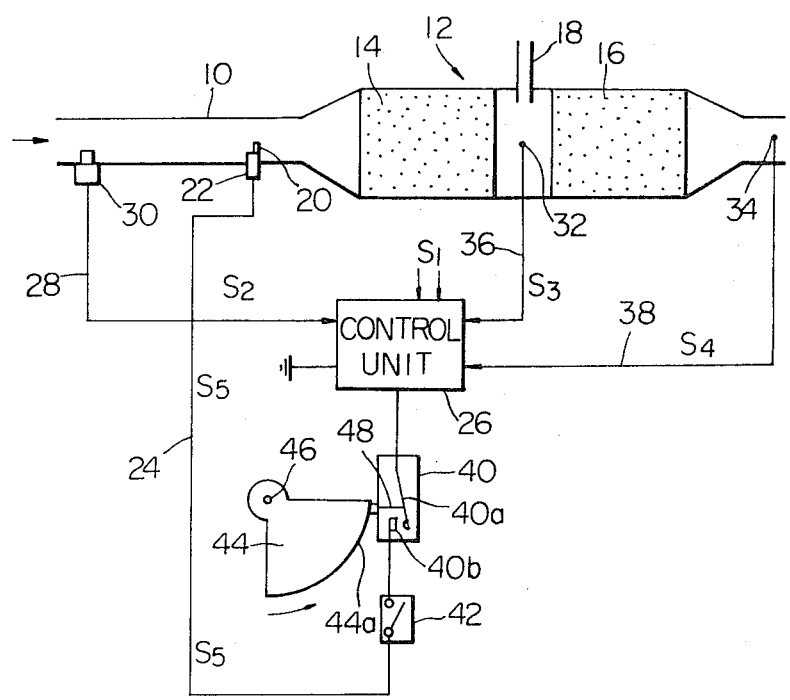
FIG. 4 is a schematic view showing a first preferred embodiment of the exhaust cleaning apparatus according to the present invention.

FIG. 4 illustrates a preferred embodiment of the exhaust cleaning apparatus to achieve this end. The embodiment herein shown is adapted to control the supply of the additional hydrocarbons to the exhaust system of the engine through detection of the concentration of the oxygen in the exhaust gases in view of the fact that the concentration of the oxygen decreases when the air-fuel mixture is enriched.

Referring to FIG. 4, the exhaust cleaning apparatus is shown as being incorporated in an exhaust pipe 10 of the exhaust system of the engine and includes a converter unit which is generally designated by reference numeral 12. The converter unit 12 is known per se and consists of reducing and oxidizing catalysts 14 and 16, respectively. The reducing catalyst 14 is usually located posteriorly to the oxidizing catalyst 16 and acts in effect to convert the nitrogen oxide in the exhaust gases passed therethrough into harmless gases of nitrogen and water, while the oxidizing catalyst 16 is active to convert the carbon monoxide and unburned hydrocarbons in the exhaust gases passed thereto from the reducing catalyst 14 into harmless carbon dioxide. An air injection nozzle 18 opens into the converter unit 12 intermediate between the reducing and oxidizing catalysts 14 and 16, respectively, for directing secondary air into the oxidizing catalyst 16 to assist in the recombustion or oxidization of the exhaust gases or, more exactly, the carbon monoxide and unburned hydrocarbons in the exhaust gases passed to the oxidizing catalyst 16. The conversion unit 12 is further provided with an additional fuel injection nozzle 20 which opens, as shown, into the exhaust pipe 10 or, though not shown, into the converter unit 12 immediately upstream of the reducing catalyst 14. The nozzle 20 is connected to a fuel discharge valve 22 which is in communication with a source (not shown) of hydrocarbons such as gasoline or liquefied petrolium gas.

The fuel discharge valve 22 is usually of the solenoid-operated type, and is connected through a line 24 to an electric control unit 26. This control unit 26 is responsive to various operational variables, such as for example, the revolution speed, intake manifold vacuum, effective working area at the throttle valve and/or torque of the crankshaft of the engine in the forms of signals $S_1$. These signals $S_1$ are herein assumed to be representative of the light-load and heavy-load driving conditions (including the acceleration condition) of the engine or, in other words, the conditions indicated by the regions R illustrated in FIG. 2 or 3. Where, thus, the input signals $S_1$ represent the vacuum in the intake manifold and the revolution speed of the engine, the signals will delivered to the control unit when the engine revolution speed is lower than $N_1$ or higher than $N_2$ and simultaneously the vacuum in the intake manifold is lower than $P_1$ or higher than $P_2$ as indicated in the graph of FIG. 3. The control unit 26 causes the fuel discharge valve 22 to open when it receives the signals $S_2$ which are produced in this manner.

The control unit 26 is further connected through a line 28 to a sensor 30 which is positioned within the exhaust pipe 10 upstream of the additional fuel injection nozzle 20. As will be described in more detail, the sensor 30 is constructed and arranged to detect the concentration of the oxygen in the exhaust gases being passed to the reducing catalyst 14 of the converter unit 12 and delivers a signal $S_2$ to the control unit 26 in response to a concentration of the oxygen which is lower than a predetermined level. This level is usually so predetermined as to be substantially in correspondence with the previously mentioned theoretical air-to-fuel ratio A of the mixture supplied to the engine. The control unit 26 is adapted to cause the additional fuel discharge valve 22 to open in response to the signal $S_2$ from the oxygen sensor 30.

Suitable temperature-sensitive elements 32 and 34 such as thermistors are positioned within the converter unit 12 immediately downstream of the reducing and oxidizing catalysts 14 and 16, respectively. These temperature-sensitive elements 32 and 34 are connected through lines 36 and 38, respectively, to the control unit 26 and deliver to the control unit signals $S_3$ and $S_4$ which are substantially representative of the temperatures of the reducing and oxidizing catalysts 14 and 16, respectively. The control unit 26 responds to these signals $S_3$ and $S_4$ for causing the additional fuel discharge valve 22 to close when the signals $S_3$ and $S_4$ are indicative of the temperatures lower than predetermined levels under which the catalysts 14 and 16 remain inactive or higher than predetermined levels above which the catalysts are subject to serious damage or deterioration in their performances.

From the foregoing description, it will be understood that the control unit 26 serves as switch means responsive to the load on the engine, the concentration of the oxygen in the exhaust gases from the engine, and the temperatures of the reducing and oxidizing catalysts of the converter units. Switches 40 and 42 are provided which are connected in series between the control unit 26 and the additional fuel discharge valve 22 for the injection nozzle 20. The switch 40 has a movable contact 40a connected to the control unit 26 and a stationary connected to the discharge valve 22 and is controlled by a sector cam 44 which is rotatable about a shaft 46 together with the throttle valve (not shown) of the mixture supply system of the engine. The sector cam 44 has a protrusion 44a formed at its working edge through which the cam is in engagement with the movable contact 40a through an actuating member 48. The protrusion 44a is so formed and located as to move the movable contact 40a away from the stationary contact 40b when the throttle valve is turned to the closed-throttle position to select the deceleration condition. The switch 40 is in this manner opened to cause the additional fuel discharge valve 22 to close in response to the decelerating mode of operation of the engine. The switch 42, on the other hand, is responsive to the starting operation of the engine and remains open when the engine is being started from the rest position.

The control unit 26 thus delivers an output signal $S_5$ to open the additional fuel discharge valve 22 so that the additional hydrocarbons are injected into the exhaust pipe 10 or directly into the converter unit 12 upstream of the reducing catalyst 14 when those conditions are concurrently established in which the engine is driven under the medium-load conditions (falling within the region L shown in FIG. 2 or 3), the concentration of the oxygen in the exhaust gases is higher than the predetermined level (so that the air-fuel mixture supplied to the engine is proportioned to an air-to-fuel ratio higher than the theoretical value A), the reducing and oxidizing catalysts 14 and 16, respectively, are heated to their operating temperatures, and the throttle valve is turned to the part-throttle or wide-open position with the accelerator pedal depressed. In the absence of any one of these various conditions, the signal $S_5$ is not fed to the additional fuel discharge valve 22 with the resultant interruption of the supply of the additional hydrocarbons to the exhaust gases being passed to the reducing catalyst 14 of the converter unit 12.

Figure 5:
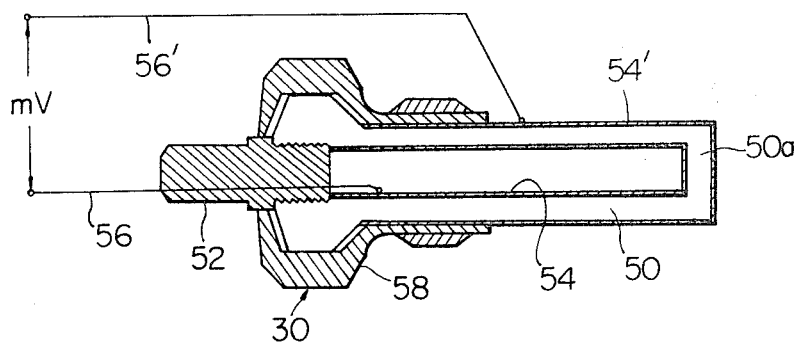
FIG. 5 is a longitudinal sectional view showing a preferred example of the oxygen sensor incorporated in the exhaust cleaning apparatus illustrated in FIG. 4.

FIG. 5 illustrates a preferred example of the sensor 30 for detecting the concentration of the oxygen in the exhaust gases discharged from the engine. The sensor 30 comprises a tubular casing 50 which is hermetically closed at one end by an end wall 60a and at the other by means of an end plug 52 which is screwed to the casing 50. The tubular casing 50 is formed of porous zirconia ceramics made from sintered zirconium oxide and has a bore or cavity extending from an inner face of the end wall 50a to an inner end of the end plug 52. Coatings 54 and 54' of a suitable electrically conductive material such as platnum are applied to inner and outer surfaces of the tubular casing by means of, for example, electroplating. These coating 54 and 54' serve as electrodes and are connected to lead lines 56 and 56'. Designated by reference numeral 58 is a metal fitting by which the sensor 30 is mounted on the exhaust pipe 10 as shown in FIG. 4.

The bore or cavity in the tubular casing 50 is filled with oxygen gas having a predetermined concentration so that the inner conductive coating 54 is constantly exposed to the oxygen gas of the fixed concentration. The outer conductive coating 54', on the other hand, is exposed to the exhaust gases being passed over to the converter unit of the previously described construction.

Figure 6:
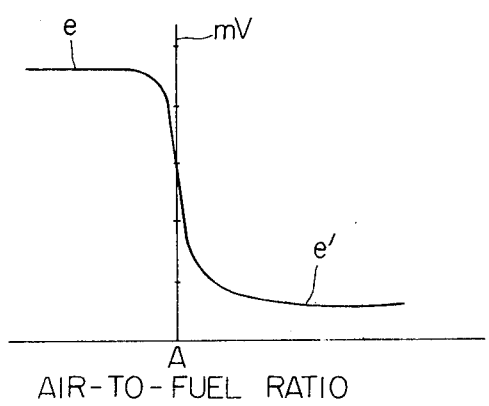
FIG. 6 is a graph illustrating a curve which indicates performance characteristics of the oxygen sensor of the construction shown in FIG. 5.

When, thus, a stream of exhaust gases containing oxygen in a concentration smaller than the concentration of the oxygen gas in the bore or cavity of the tubular cavity 50 prevails around the outer platinum coating 54' at a temperature within a certain range, then ions of oxygen travel between the inner and outer coatings 54 and 54', respectively, through the zirconia ceramics forming the tubular casing 50, producing between the coatings an electromotive force mv which is substantially proportional to the differential between the concentrations of the oxygen in the exhaust gases and of the oxygen existing in the bore or cavity in the casing 50. FIG. 6 illustrates a curve which is indicative of the variation of the thus produced electromotive force mv in terms of the air-to-fuel ratio of the mixture supplied to the engine. As apparently observed from this curve, a relatively large electric current is generated from the sensor when the air-fuel mixture is proportioned to an air-to-fuel ratio lower than the theoretical value A as indicated by a portion e of the curve and the current abruptly drops to a level indicated by a portion e' of the curve as the air-to-fuel ratio of the mixture approaches and exceed the theoretical value A. An analysis is being made in an effort to clarify the reasons accounting for this phenomenon. Suffice, at the present stage of the research and development, it to say that the particular performance characteristics of the sensor above described are extremely congruous for the purpose of achieving the desired end effect of the exhaust cleaning apparatus of the construction shown in FIG. 4.

Figure 7:
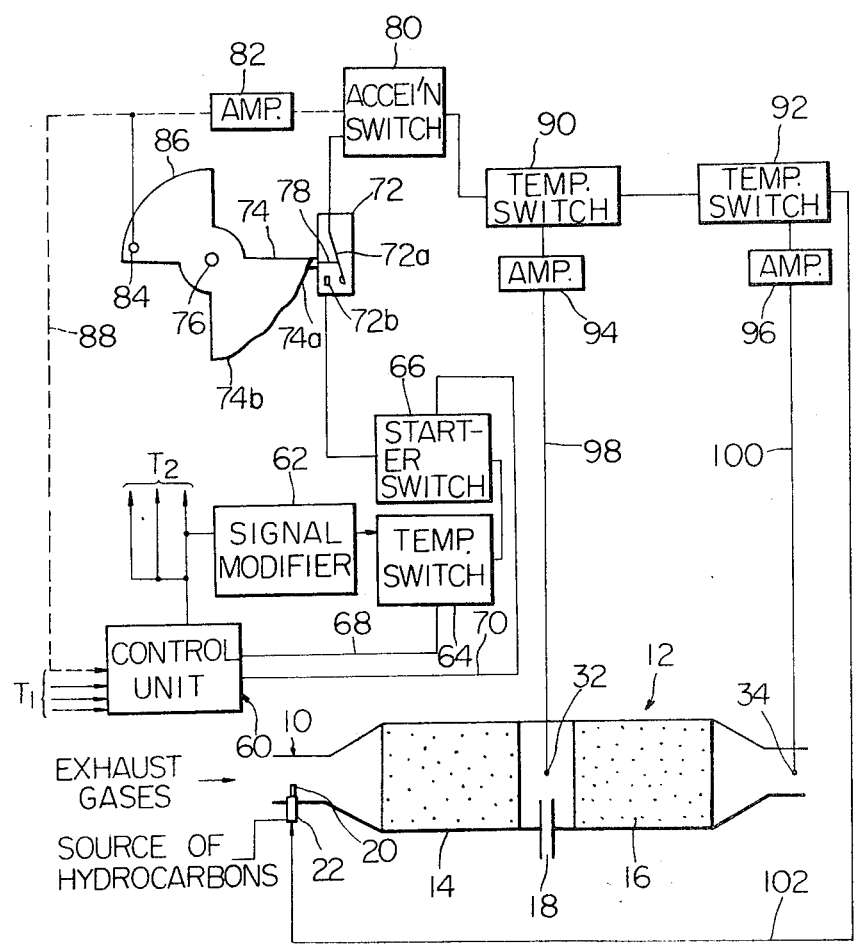
FIG. 7 is a schematic view showing a second preferred embodiment of the exhaust cleaning apparatus according to the present invention.

FIG. 7 illustrates another preferred embodiment of the exhaust cleaning apparatus according to the present invention. The embodiment herein shown is exemplified as being incorporated in an electronically controlled fuel injection internal combustion engine. In the fuel injection internal combustion engine, fuel is injected into the intake manifolds at timings and for durations which are controlled by an electronic control unit which is designated by reference numeral 60. The control unit 60 receives input signals $T_1$ representing various operational variables of the engine and delivers control signals $T_2$ to actuating means for the fuel injectors (not shown) located anterior to the intake valves of the individual cylinders, as is well known in the art. These control signals $T_2$ are usually in the form of pulses having pulsewidths dictating the timings and durations of the fuel injection. The exhaust cleaning apparatus shown in FIG. 7 is controlled by the aid of the control unit 60 of this character. The converter unit 12 of the exhaust cleaning apparatus shown in FIG. 7 is constructed essentially similarly to the corresponding unit of the apparatus illustrated in FIG. 4 and, as such, description of the construction of the latter will apply as it is to the converter unit 12 of the apparatus shown in FIG. 7.

In the embodiment illustrated in FIG. 7, the signals $T_2$ are supplied not only to the fuel injectors in the intake manifolds of the engine but to a signal modifier 62 so that the pulsewidths of the signals $T_2$ are shortened with a predetermined ratio. The signal modifier 62 thus produces signals $T_3$ in the form of pulses having pulsewidths smaller than those of the signals $T_2$. The signals $T_3$ are fed to the solenoid-operated additional fuel discharge valve 22 through a switching arrangement including various switch means representative of the operational conditions of the engine and the exhaust system of the engine.

The switching arrangement comprises temperature-sensitive switch means 64 and starter switch means 66. The temperature-sensitive switch means 64 is responsive to the temperature of the engine or more specifically of the cooling fluid of the engine and is operative to open in response to an engine temperature lower than a predetermined level. The starter switch means 66, on the other hand, is adapted to open when the starter motor (not shown) is being driven and closes once the engine has been cranked. These switches 64 and 66 may be connected directly to the thermostat and starter motor, respectively, of the motor or, as illustrated in FIG. 7, may be connected through lines 68 and 70, respectively, to the control unit 60 so as to be responsive to signals representing the engine temperature and the starting condition of the engine.

The switching arrangement further comprises a throttle switch 72 having a movable contact 72a and a stationary contact 72b. The movable contact 72a is moved by a sector cam 74 which is rotatable about a shaft 76 together with the throttle valve (not shown) in the air meter of the mixture supply system of the engine. The sector cam 74 has a cam lobe which is formed with angularly spaced protrusions 74a and 74b which are so located as to be responsive to the closed-throttle and full-throttle positions, respectively, of the throttle valve. The cam 74 is engageable with the movable contact 72a through an actuating member 76 so that the movable contact is moved away from the stationary contact 72b when the cam 74 is turned by the throttle valve to positions in which the actuating member 76 is in engagement with either of the spaced protrusions 74a and 74b of the cam 74. The throttle switch 72 is thus adapted to open in response to the heavy-load and light-load driving conditions of the engine and close in response to the part-throttle position of the throttle valve providing the mediumload driving condition of the engine. In other words, the throttle switch 72 is responsive to the regions R and L of the graph illustrated in FIG. 2.

The fuel injection internal combustion engines are usually so designed that the throttle valves are rapidly opened when the accelerator pedals are depressed to accelerate the engines. To interrupt the supply of the additional hydrocarbons to the exhaust system in response to the acceleration condition thus established, the switching arrangement further includes acceleration-responsive switch means 80 connected through an amplifier 82 to an acceleration-responsive element 84. This acceleration-responsive element 84 may be constructed and arranged in any suitable manner insofar as it is capable of responding to the acceleration condition of the engine. In the embodiment shown in FIG. 7, the acceleration-responsive element 84 is shown as associated with the sector cam 72 through a movable member 86 which is rotatable with the cam 72 about the shaft 76. The acceleration-responsive element 84 is thus responsive to an angular velocity of the cam 72 and consequently the throttle valve and causes the acceleration-responsive switch means 80 to open when the throttle valve and accordingly the sector cam 72 are turned about the shaft 76 at an angular velocity higher than a predetermined value. The acceleration-responsive element 84 may be connected to the control unit 60 through a line 88 for supplying the control unit with signals representative of the acceleration conditions of the engine.

The switching arrangement still further includes temperature-responsive switch means 90 and 92 which are respectively connected through amplifiers 94 and 96 and lines 98 and 100 to the temperature-sensitive elements 32 and 34, which may be thermistors. These temperaturesensitive elements 32 and 34 are responsive to the temperatures of the reducing and oxidizing catalysts 14 and 16, respectively, of the converter unit 12 as previously described so that the switch means 90 and 92 are open when the temperatures of the catalysts 14 and 16 are lower than or higher than the predetermined operating temperature ranges of the catalysts.

The switching arrangement of the exhaust cleaning apparatus shown in FIG. 7 thus consists of the temperature-sensitive switch means 64 responsive to the engine temperature, the starter switch means 66 responsive to the starting condition of the engine, the throttle switch 72 responsive to the heavy-load and light-load driving conditions of the engine, the acceleration-responsive switch means 80 responsive to the acceleration conditions of the engine, and the temperature-responsive switch means 90 and 92 responsive to the temperatures of the reducing and oxidizing catalysts 14 and 16 of the converter unit 12. These switch means are all conserially to the solenoid-operated additional fuel discharge valve 22 for the injection nozzle 20 through a line 102 so that the additional hydrocarbons are injected into the exhaust gases entering the reducing catalyst 14 when all of the switch means are closed, viz., under those conditions in which the engine has been cranked and warmed up to its operating temperature is being driven with the throttle valve turned to the part-throttle position to establish the acceleration condition, and the reducing and oxidizing catalysts of the converter unit are heated to their operating temperatures.

Figure 8:
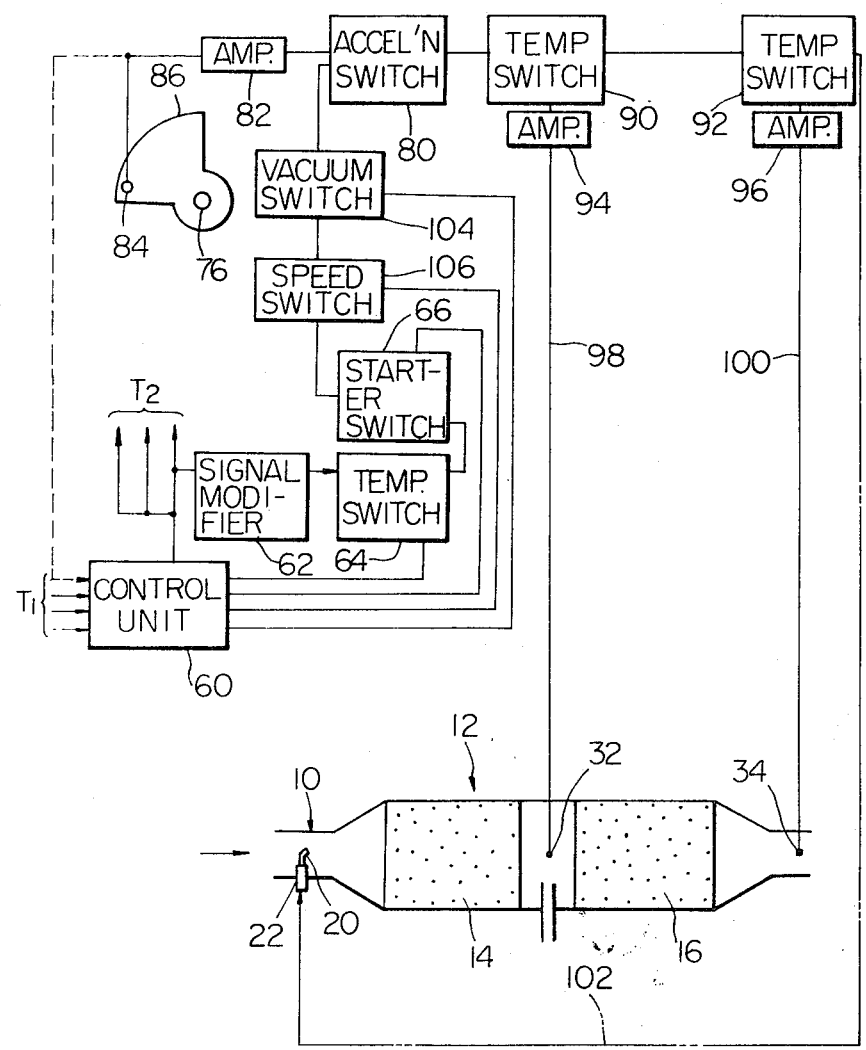
FIG. 8 is also a schematic view showing a modification of the exhaust cleaning apparatus illustrated in FIG. 6.

The light-load and heavy-load driving conditions are detected from the angular positions of the throttle valve in the embodiment of the exhaust cleaning apparatus above described so as to control the supply of the additional hydrocarbons to the exhaust system depending upon the regions R and L of the graph illustrated in FIG. 2. It is, however, apparent that the light-load and heavy-load driving conditions of the engine can be detected through sensing of the engine revolution speed and the vacuum in the intake manifolds of the engine so as to control the supply of the additional hydrocarbons to the exhaust system depending upon the regions R and L of the graph illustrated in FIG. 3. FIG. 8 illustrates an embodiment of the exhaust cleaning apparatus having a switching arrangement adapted to operate on this principle. The embodiment herein shown is essentially similar to that illustrated in FIG. 7 and like reference numerals and characters denote corresponding parts and elements in both figures.

As an alternative to the throttle switch 72 incorporated in the switching arrangement of the apparatus shown in FIG. 7, the switching arrangement of the exhaust cleaning apparatus illustrated in FIG. 8 uses a combination of vacuum-responsive switch means 104 and speed-responsive switch means 106 which are connected in series between the starter switch 66 and the acceleration-responsive switch 80. The vacuum-responsive switch means 104 is responsive to the vacuum obtaining in the intake manifold of the engine so as to be open when the vacuum in the intake manifold is lower than a predetermined level of, say, $P_1$ and higher than another predetermined level of $P_2$ (see FIG. 3). The speedresponsive switch means 106, on the other hand, is responsive to the revolution speed of the engine crank-shaft and is operative to open when the engine revolution speed is lower than a predetermined level of $N_1$ or higher than another predetermined level of $N_2$ (see FIG. 3). The switch means 104 and 106 thus close when the vacuum in the intake manifold of the engine is within a range of between $P_1$ and $P_2$ and the engine revolution speed is within a range of between $N_1$ and $N_2$ so that the conditions corresponding to the region L of the graph shown in FIG. 3 is established.

The embodiments shown in FIGS. 7 and 8 have been assumed to be applied to the fuel injection internal combustion engine but it is apparent that the exhaust cleaning apparatus or more particularly the switching arrangement of the apparatus shown in FIG. 7 or 8 is applicable in essence to the internal combustion engines of any other types such as the type using the carburetors.

What is claimed is:

1. An exhaust cleaning apparatus for an internal combustion engine comprising reducing catalyst means disposed in an exhaust system of the engine for reducing nitrogen oxide in exhaust gases passed to the exhaust system from the engine, oxidizing catalyst means disposed in the exhaust system and located downstream of said reducing catalyst for oxidizing carbon monoxide and unburned hydrocarbons in the exhaust gases passed from said reducing catalyst means, additional fuel supplying means for admixing additional hydrocarbons to the exhaust gases entering said reducing catalyst means, and control means for controlling said additional fuel supplying means for interrupting the supply of the additional hydrocarbons to the exhaust gases in response to engine operating conditions producing enrichment of an air-fuel mixture to be supplied to the engine, in which said control means comprises a sensor which is responsive to the concentration of oxygen in the exhaust gases entering said reducing catalyst means for producing an electrical signal in response to a concentration of the oxygen lower than a predetermined level and a switching arrangement comprising first, second and third switch means electrically connected in series to said additional fuel supplying means for controlling the fuel supplying means to interrupt the supply of said additional hydrocarbons to the exhaust gases when at least one of said first to third switch means is open, said first switch means being operative to close in response to said electrical signal from said sensor, said second switch means being responsive to the load on the engine and operative to open in response to an engine load smaller than a first predetermined value larger than said first predetermined value, said third switch means being responsive to a starting condition of the engine and operative to open when the engine is being started.

2. An exhaust cleaning apparatus for an internal combustion engine comprising reducing catalyst means disposed in an exhaust system of the engine for reducing nitrogen oxide in exhaust gases passed to the exhaust system from the engine, oxidizing catalyst means disposed in the exhaust system and located downstream of said reducing catalyst for oxidizing carbon monoxide and unburned hydrocarbons in the exhaust gases passed from said reducing catalyst means, additional fuel supplying means for admixing additional hydrocarbons to the exhaust gases entering said reducing catalyst means, and control means for controlling said additional fuel supplying means for interrupting the supply of the additional hydrocarbons to the exhaust gases in response to engine operating conditions producing enrichment of an air-fuel mixture to be supplied to the engine, in which said control means comprises a sensor which is responsive to the concentration of oxygen in the exhaust gases entering said reducing catalyst means for producing an electrical signal in response to a concentration of the oxygen lower than a predetermined level and a switching arrangement comprising first to fourth switch means which are electrically connected in series to said additional fuel supplying means for controlling the fuel supplying means to interrupt the supply of said additional hydrocarbons to the exhaust gases when at least one of said first to fourth switch means being operative to close in response to said electrical signal from said sensor, the second switch means being responsive to the load on the engine and operative to open in response to an engine load smaller than a first predetermined value or greater than second predetermined value larger than said first predetermined value, the third switch means being responsive to a starting condition of the engine and operative to open when the engine is being started, the fourth switch means being responsive to the temperatures of said reducing and oxidizing catalyst means and operative to close when said temperatures are within predetermined ranges in which said catalyst means are maintained active.

3. An exhaust cleaning apparatus for an internal combustion engine comprising reducing catalyst means disposed in an exhaust system of the engine for reducing nitrogen oxide in exhaust gases passed to the exhaust system from the engine, oxidizing catalyst means disposed in the exhaust system and located downstream of said reducing catalyst for oxidizing carbon monoxide and unburned hydrocarbons in the exhaust gases passed from said reducing catalyst means, additional fuel supplying means for admixing additional hydrocarbons to the exhaust gases entering said reducing catalyst means, and control means for controlling said additional fuel supplying means for interrupting the supply of the additional hydrocarbons to the exhaust gases in response to engine operating conditions producing enrichment of an air-fuel mixture to be supplied to the engine, in which said control means comprises first and second switch means which are serially connected to said additional fuel supplying means for controlling the additional fuel supplying means to interrupt the supply of said additional hydrocarbons to the exhaust gases when at least either of said first and second switch means is open, said first switch means being responsive to the load on the engine and operative to open in response to an engine load smaller than a first predetermined value or greater than a second predetermined value larger than said first predetermined value, said second switch means being responsive to an acceleration condition of the engine and operative to open in response to the acceleration condition.

4. An exhaust cleaning apparatus as claimed in claim 3, in which said first switch means comprises movable and stationary contacts and a cam rotatable with a throttle valve of the engine and having a cam lobe which is formed with angularly spaced protrusions located to be representative of closed-throttle and full-throttle positions of the throttle valve and engageable with said movable contact for moving the movable contact away from said stationary contact when the throttle valve is in the closed-throttle or full-throttle position.

5. An exhaust cleaning apparatus as claimed in claim 3, in which said first switch means comprise a vacuum-responsive switch and a speed-responsive switch which are connected in series to each other, said vacuum-responsive switch being responsive to the vacuum in an intake manifold of the engine and operative to open in response to a vacuum lower than a predetermined level or higher than another predetermined level which is higher than the former.

6. An exhaust cleaning apparatus as claimed in claim 3, in which said second switch means comprises a movable member rotatable with a throttle valve of the engine and responsive to an angular velocity of the throttle valve when the throttle valve is turned for acceleration, said second switch means opening in response to an angular velocity of the throttle valve greater than a predetermined level.

7. An exhaust cleaning apparatus for an internal combustion engine comprising reducing catalyst means disposed in an exhaust system of the engine for reducing nitrogen oxide in exhaust gases passed to the exhaust system from the engine, oxidizing catalyst means disposed in the exhaust system and located downstream of said reducing catalyst for oxidizing carbon monoxide and unburned hydrocarbons in the exhaust gases passed from said reducing catalyst means, additional fuel supplying means for admixing additional hydrocarbons to the exhaust gases entering said reducing catalyst means, and control means for controlling said additional fuel supplying means for interrupting the supply of the additional hydrocarbons to the exhaust gases in response to engine operating conditions producing enrichment of an air-fuel mixture to be supplied to the engine, in which said control means comprises first to third switch means which are serially connected to said additional fuel supplying means for controlling the additional fuel supplying means to interrupt the supply of said additional hydrocarbons to the exhaust gases when one of said first to third switch means is open, the first switch means being responsive to the load on the engine and operative to open in response to an engine load smaller than a first predetermined value or greater than a second predetermined value larger than the first predetermined value, the second switch means being responsive to an acceleration condition of the engine and operative to open in response to the acceleration condition, and the third switch means being responsive to a starting condition of the engine and operative to open when the engine is being started.

8. An exhaust cleaning apparatus for an internal combustion engine comprising reducing catalyst means disposed in an exhaust system of the engine for reducing nitrogen oxide in exhaust gases passed to the exhaust system from the engine, oxidizing catalyst means disposed in the exhaust system and located downstream of said reducing catalyst for oxidizing carbon monoxide and unburned hydrocarbons in the exhaust gases passed from said reducing catalyst means, additional fuel supplying means for admixing additional hydrocarbons to the exhaust gases entering said reducing catalyst means, and control means for controlling said additional fuel supplying means for interrupting the supply of the additional hydrocarbons to the exhaust gases in response to engine operating conditions producing enrichment of an air-fuel mixture to be supplied to the engine, in which said control means comprises first to fifth switch means which are serially connected to said additional fuel supplying means for controlling the additional fuel supplying means to interrupt the supply of said additional hydrocarbons to the exhaust gases when at least one of said first to fifth switch means is open, the first switch means being responsive to the load on the engine and operative to open in response to an engine load smaller than a first predetermined value or greater than a second predetermined value which is larger than said first predetermined value, the second switch means being responsive to an acceleration condition of the engine and operative to open in response to the acceleration condition, the third switch means being responsive to a starting condition of the engine and operative to open when the engine is being started, the fourth and fifth switch means being responsive to the temperatures of said reducing and oxidizing catalyst means, respectively, and operative to open in response to the temperatures of the catalyst means lower than predetermined levels or higher than other predetermined levels which are higher than the former.

9. An exhaust cleaning apparatus for an internal combustion engine comprising reducing catalyst means disposed in an exhaust system of the engine for reducing nitrogen oxide in exhaust gases passed to the exhaust system from the engine, oxidizing catalyst means disposed in the exhaust system and located downstream of said reducing catalyst for oxidizing carbon monoxide and unburned hydrocarbons in the exhaust gases passed from said reducing catalyst means, additional fuel supplying means for admixing additional hydrocarbons to the exhaust gases entering said reducing catalyst means, and control means for controlling said additional fuel supplying means for interrupting the supply of the additional hydrocarbons to the exhaust gases in response to engine operating conditions producing enrichment of an air-fuel mixture to be supplied to the engine, in which said control means comprises first to sixth means which are serially connected to said additional fuel supplying means for controlling the additional fuel supplying means to interrupt the supply of said additional hydrocarbons to the exhaust gases, the first switch means being responsive to the load on the engine and operative to open in response to an engine load smaller than a first predetermined value or greater than a second predetermined value which is larger than the first predetermined value, the second switch means being responsive to an acceleration of the engine and operative to open in response to the acceleration condition, the third switch being responsive to a starting condition of the engine and operative to open when the engine is being started, the fourth and fifth switch means being responsive to the temperatures of said reducing and and oxidizing catalyst means, respectively, and operative to open in response to the temperatures of the catalyst means lower than predetermined levels or higher than other predetermined levels which are higher than the former, and the sixth switch means being responsive to the engine temperature and operative to open in response to an engine temperature lower than a predetermined level.

* * * * *